United States Patent
Zhao et al.

(10) Patent No.: US 12,079,003 B1
(45) Date of Patent: Sep. 3, 2024

(54) POOL CLEANING SYSTEM WITH A VIDEO CAPTURE DEVICE

(71) Applicant: Degrii Co., Ltd., Suzhou (CN)

(72) Inventors: Ye Zhao, Beijing (CN); Fei Zhao, Beijing (CN)

(73) Assignee: DEGRII CO., LTD., Suzhou (CN)

( * ) Notice: Subject to any disclaimer, the term of this patent is extended or adjusted under 35 U.S.C. 154(b) by 0 days.

(21) Appl. No.: 18/507,120

(22) Filed: Nov. 13, 2023

(30) Foreign Application Priority Data

Oct. 27, 2023 (CN) .......................... 202311405628.5

(51) Int. Cl.
*G05D 1/00* (2024.01)
*E04H 4/16* (2006.01)

(52) U.S. Cl.
CPC .......... *G05D 1/0246* (2013.01); *E04H 4/1654* (2013.01)

(58) Field of Classification Search
CPC ......... G05D 1/0246; G05D 2201/0203; G05D 1/00; E04H 4/1654
USPC ........................................................ 701/28
See application file for complete search history.

(56) References Cited

U.S. PATENT DOCUMENTS

| | | | |
|---|---|---|---|
| 7,362,351 B2* | 4/2008 | Meniere | G06T 7/20 348/135 |
| 11,003,191 B2* | 5/2021 | Durvasula | G05D 1/0246 |
| 11,504,607 B2* | 11/2022 | Weitzman | G06V 40/16 |
| 2013/0152970 A1* | 6/2013 | Porat | E04H 4/1654 134/18 |
| 2016/0148711 A1* | 5/2016 | Strohmayer | E02F 3/8833 15/1.7 |
| 2018/0266134 A1* | 9/2018 | Pichon | G05D 1/0206 |
| 2019/0010062 A1* | 1/2019 | Beech | G07C 3/12 |
| 2019/0271987 A1* | 9/2019 | Durvasula | G05D 1/0016 |
| 2020/0333797 A1* | 10/2020 | Durvasula | H04N 7/18 |
| 2022/0129005 A1* | 4/2022 | Durvasula | G05D 1/0038 |

* cited by examiner

*Primary Examiner* — Shardul D Patel

(57) ABSTRACT

A pool cleaning system is provided. The system comprises a video capture device, a pool cleaning robot separated from the video capture device, and a computing device. The video capture device can transmit one or more videos of a pool to the computing device. The computing device can determine a position of the pool cleaning robot relative to the pool using the one or more videos. The computing device can generate a moving instruction for the pool cleaning robot, based on the position of the pool cleaning robot.

7 Claims, 4 Drawing Sheets

POOL CLEANING SYSTEM WITH A VIDEO CAPTURE DEVICE

TECHNOLOGICAL FIELD

The present disclosure relates generally to a pool cleaning system, and in particular, to a pool cleaning system with a video capture device to help control a pool cleaning robot.

BACKGROUND

Pool cleaning robots can be used for cleaning the bottom and walls of swimming pools. Pool cleaning robots can provide precise and thorough cleaning and lessen human involvement. Thus, pool cleaning robots are becoming more popular in both residential and commercial scenarios.

Some pool cleaning robots rely on laser or vision sensors to monitor environment of a pool and generate a route or path for the pool cleaning robots to perform cleaning tasks. Using laser, ultrasonic, infrared or underwater vision sensors may increase the costs and hardware complexity of the pool cleaning robots.

Therefore, it would be desirable to have a system and method that takes into account at least some of the issues discussed above, as well as other possible issues.

BRIEF SUMMARY

Example embodiments of the present disclosure are directed to a pool cleaning system with a video capture device to help control a pool clean robot. Example embodiments can provide a pool cleaning system without using expensive sensors on the pool clean robot. Instead, example embodiments utilize a separate video capture device to determine and track the position of the pool clean robot. Thus, example embodiments may reduce the costs and hardware complexity of the pool clean robot.

The present disclosure thus includes, without limitation, the following example embodiments.

Some embodiments provide a system. The system comprises a video capture device, a pool cleaning robot separated from the video capture device, and a computing device. The video capture device is configured to transmit one or more videos of a pool to the computing device. The computing device comprises a memory and a processor, wherein the memory stores executable instructions that, in response to execution by the processor, cause the computing device to at least: determine a position of the pool cleaning robot relative to the pool using the one or more videos, and generate a moving instruction for the pool cleaning robot, based on the position of the pool cleaning robot.

In some embodiments, the one or more videos include a first video and a second video.

In some embodiments, the computing device being caused to determine the position of the pool cleaning robot incudes being caused to: create a coordinate system for the pool using the first video; and determine the position of the pool cleaning robot relative to the pool using the second video and based on the coordinate system.

In some embodiments, the computing device is separated from the pool cleaning robot.

In some embodiments, the pool cleaning robot includes a mark, and the video capture device is configured to track the position of the pool cleaning robot based on the mark.

In some embodiments, the computing device is connected to a floating wireless charger for charging the pool cleaning robot.

In some embodiments, the computing device is separated from the video capture device.

In some embodiments, the computing device includes the video capture device.

In some embodiments, the system further includes a secondary computing device that is a server in a cloud computing system.

Some embodiments provide a computing device. The computing device comprises a memory and a processor, wherein the memory stores executable instructions that, in response to execution by the processor, cause the computing device to at least: determine a position of a pool cleaning robot relative to a pool using one or more videos transmitted from a video capture device to the computing device; and generate a moving instruction for the pool cleaning robot, based on the position of the pool cleaning robot, wherein the pool cleaning robot is separated from the video capture device.

Some embodiments provide a method implemented by a computing device. The method comprises determining a position of a pool cleaning robot relative to a pool using one or more videos transmitted from a video capture device to the computing device; and generating a moving instruction for the pool cleaning robot, based on the position of the pool cleaning robot, wherein the pool cleaning robot is separated from the video capture device.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
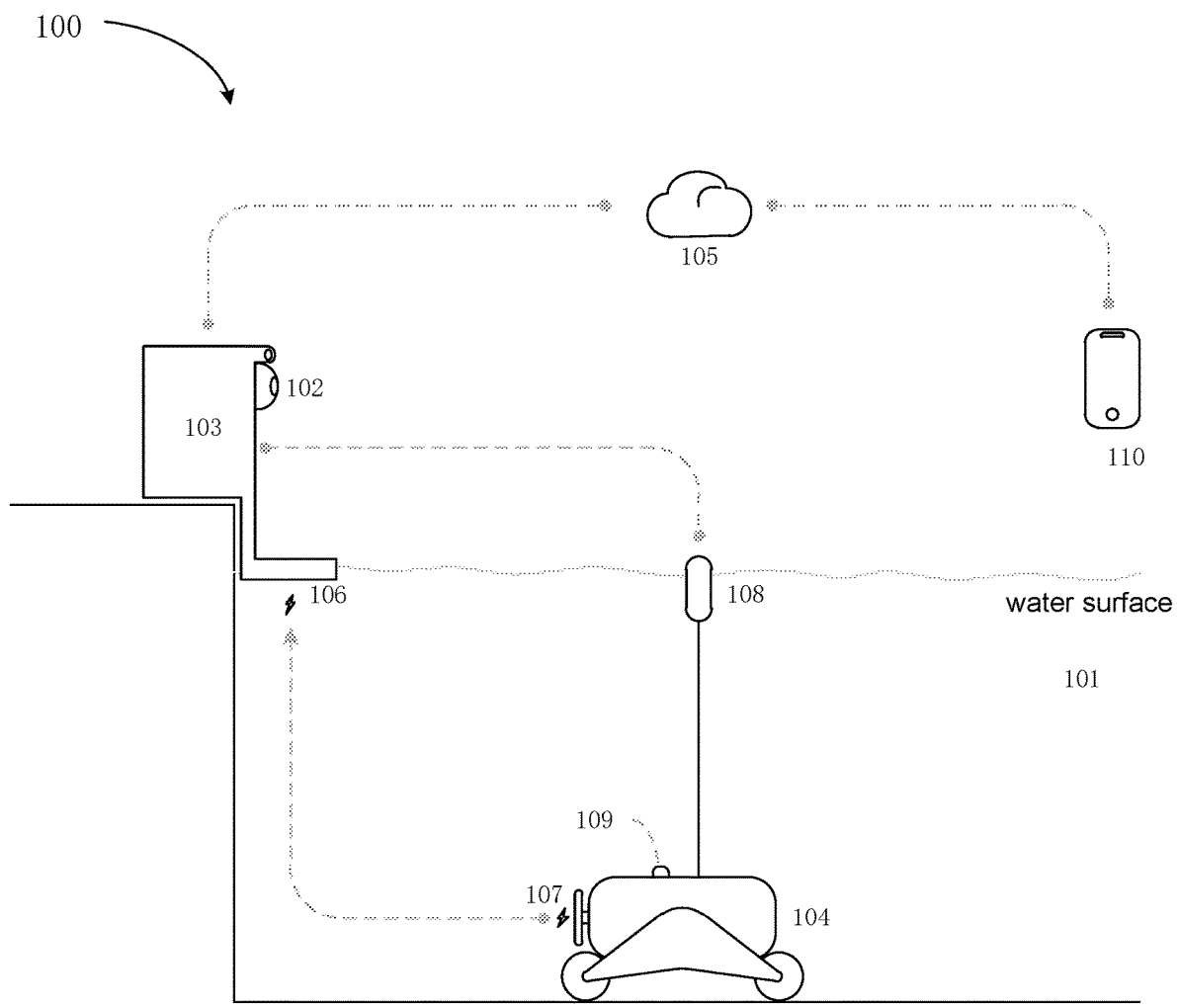
FIG. 1 illustrates a pool cleaning system for a pool, according to some embodiments of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Like reference numerals refer to like elements throughout.

The system is primarily described in the context of a pool cleaning system, but it should be understood that the system is equally applicable to some mowing robot systems, snow removing systems, indoor robot vacuum systems.

FIG. 1 illustrates a pool cleaning system 100 for a pool 101, according to some embodiments of the present disclosure. As shown, the pool cleaning system 100 includes a video capture device 102, a computing device 103 and a pool cleaning robot 104. The video capture device 102 is spatially separated from the pool cleaning robot 104. In other words, the video capture device 102 is not physically positioned on the pool cleaning robot 104.

In some embodiments, the video capture device 102 can transmit one or more videos of the pool 101 to the computing device 103. In some examples, the video capture device 102 can capture videos of the pool 101 and communicate with the computing device 103 through technologies such as WiFi or Bluetooth technologies. The video capture device 102 may be an electronic device including a camera and a wireless transmitter and/or receiver. In some embodiments, as shown in FIG. 1, the computing device 103 includes the video capture device 102 or the video capture device 102 is positioned on the computing device 103. In some other embodiments, the computing device 103 is separated from the video capture device 102 and can communicate with the video capture device 102 through wireless or wired communications.

In some embodiments, the computing device 103 can determine a position of the pool cleaning robot 104 relative to the pool 101 using the one or more videos received form the video capture device 102. The computing device 103 can generate a moving instruction for the pool cleaning robot 104, based on the position of the pool cleaning robot 104. In some examples, the moving instruction may instruct the pool cleaning robot 104 to move toward different directions to a specific or desired location of the pool 101.

In some embodiments, the one or more videos transmitted from the video capture device 102 to the computing device 103 include a first video and a second video that are different. The first video may be a real time video of the pool 101, and the second video may be a previously recorded video. The computing device 103 can create a coordinate system for the pool 101 using the first video, and determine the position of the pool cleaning robot 104 relative to the pool 101 using the second video and based on the coordinate system. Details will be described below with respect to FIG. 2.

In some embodiments, the computing device 103 can create a coordinate system for the pool 101 using a video such as a real time video of the pool 101, and determine the position of the pool cleaning robot 104 relative to the pool 101 using the same video and based on the coordinate system. Details will be described below with respect to FIG. 2.

In some embodiments, the computing device 103 may continuously receive data from the video capture device 102 and determine the position of the pool cleaning robot 104, and automatically generate the moving instruction for the pool cleaning robot 104 based on the continuously received data.

In some embodiments, the pool cleaning robot 104 includes a mark 109 such as a lighting device or an identification light. The video capture device 102 is configured to track the position of the pool cleaning robot 104 based on the mark 109. For example, the video capture device 102 can track the position of the pool cleaning robot 104 by tracking the mark 109, in cases such as the distance between the video capture device 102 and the pool cleaning robot 104 is far or in dark nights.

In some embodiments, the computing device 103 is separated from the pool cleaning robot 104. In some embodiments, the pool cleaning system 100 further includes a secondary computing device 105, which may be a server in a cloud computing system. The secondary computing device 105 may perform at least part of the functions of the computing device 103, as described below with respect to FIG. 2.

In some embodiments, the computing device 103 may be a base station and located near the pool 101, as shown in FIG. 1. The video capture device 102 is on the computing device 103. In some examples, the video capture device 102 can transmit the one or more videos to the computing device 103. In some examples, the video capture device 102 can transmit the one or more videos to the secondary computing device 105 through the computing device 103. The computing device 103 may include WiFi or Bluetooth transmitters and/or receivers and can communicate with the secondary computing device 105.

In some embodiments, as shown in FIG. 1, the computing device 103 is connected to a floating wireless charger 106 for charging the pool cleaning robot 104. The pool cleaning robot 104 may include a receiving charger 107 and may move to the floating wireless charger 106 for charging, as shown in FIG. 1. The floating wireless charger 106 may be a part of the pool cleaning system 100.

In some embodiments, the secondary computing device 105 may generate the moving instruction and send to the computing device 103, and the computing device 103 may forward the moving instruction to the pool cleaning robot 104. The computing device 103 may communicate with the pool cleaning robot 104 through a floating antenna 108 connected to the pool cleaning robot 104 using technologies such as WiFi, Bluetooth, or ZigBee, as shown in FIG. 1. The floating antenna 108 may be a part of the pool cleaning system 100.

In some embodiments, the pool cleaning system 100 may also include a user device 110 such as a mobile device or cell phone. The user device 110 may have an application (App) installed on it. A user can control the pool cleaning robot 104 through the App on the user device 110. For example, as shown in FIG. 1, the user can use the App to communicate with the secondary computing device 105 and ask the secondary computing device 105 to generate a user-desired moving instruction for the pool cleaning robot 104. The user-desired moving instruction may guide the pool cleaning robot 104 to move to a specific location or clean a specific area or approach to the floating wireless charger 106 for charging. The App on the user device 110 can also directly communicate with the floating antenna 108 to guide the pool cleaning robot 104.

In some embodiments, due to the use of the video capture device 102, the pool cleaning robot 104 does not need to have any laser sensors, ultrasonic sensors or underwater vision sensors. The pool cleaning robot 104 may not have any sensor for distance measurement.

Figure 2:
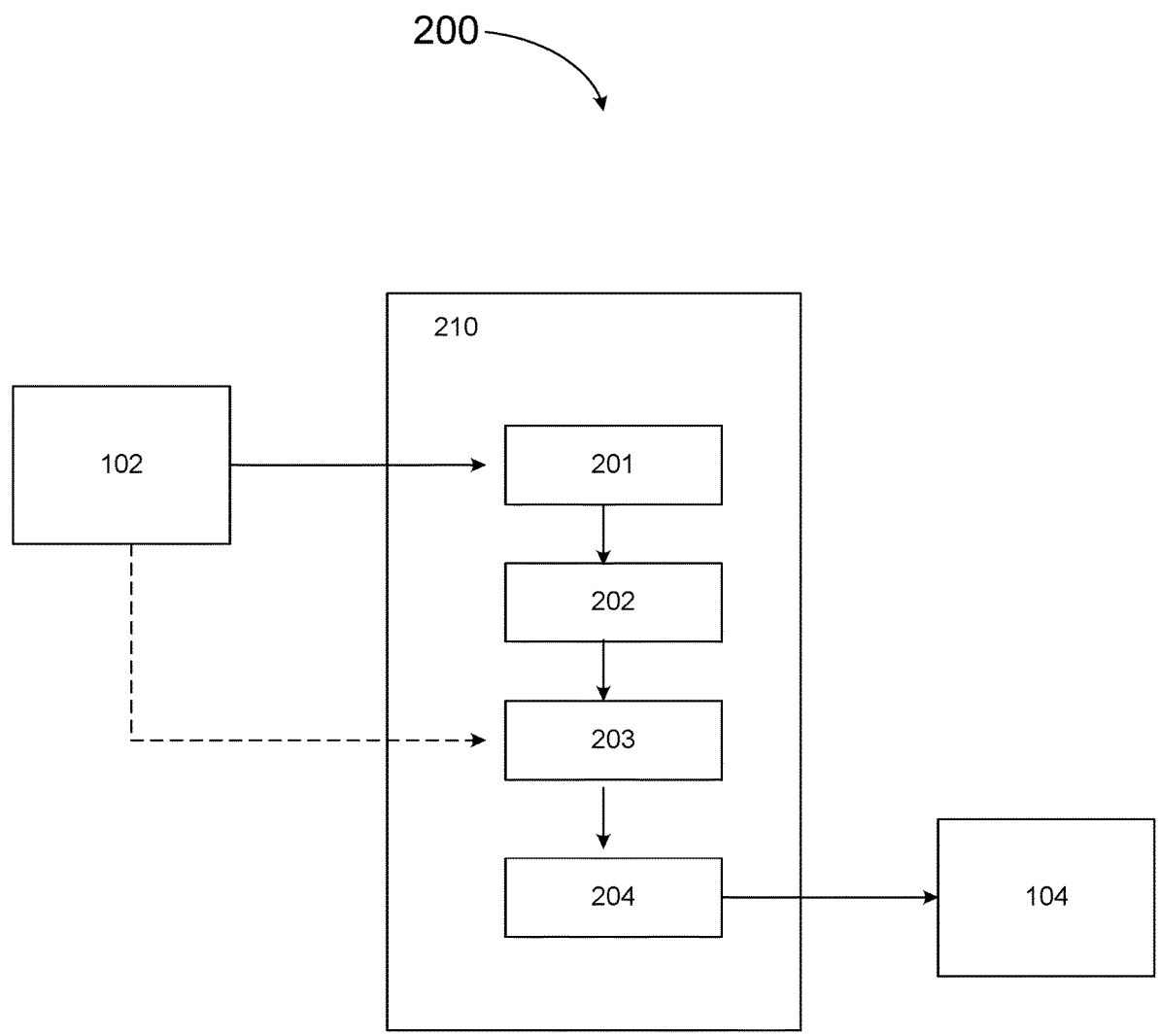
FIG. 2 illustrates a pool cleaning system, according to some embodiments of the present disclosure.

FIG. 2 illustrates a pool cleaning system 200, according to some embodiments of the present disclosure. The pool cleaning system 200 may correspond to the pool cleaning system 100 with some components such as the secondary computing device 105 and user device 110 omitted for simplicity of illustration.

As shown in FIG. 2, the pool cleaning system 200 includes the video capture device 102 and the pool cleaning robot 104, which are described above in FIG. 1. The pool cleaning system 200 also includes a processing system 210. In some examples, the processing system 210 may be implemented by the computing device 103 as described above in FIG. 1. In some examples, as described in greater detail with reference to FIG. 3, the processing system 210 may be implemented by the computing device 300.

The processing system 210 includes any of a number of different subsystems (each an individual system) for performing one or more functions or operations. As shown, in some examples, the processing system 210 includes one or more of each of an enhancement module 201, a segmentation module 202, a localization module 203, and a path-planning module 204. The subsystems may be co-located or directly coupled to one another, or in some examples, various ones of the subsystems may communicate with one another across one or more computer networks. Further, although shown as part of the system, it should be understood that any one or more of the enhancement module 201, segmentation module 202, localization module 203, and path-planning module 204 may function or operate as a separate system without regard to any of the other subsystems. It should also be understood that the system may include one or more additional or alternative subsystems than those shown in FIG. 2.

In some examples, the enhancement module 201 can receive the one or more videos from the video capture device 102. The enhancement module 201 can perform adjustments and enhancements such as noise reduction, color correction and image stabilization to increase the quality and/or accuracy of the received videos. The enhancement module 201 can perform adjustments and enhancements to the received videos by using algorithms such as white balance, gamma correction, sharpening, mobile stabilization, and filtering algorithms, as understood in the art.

In some examples, the segmentation module 202 can receive the adjusted and enhanced one or more videos from the enhancement module 201. The segmentation module 202 can create a coordinate system for the pool using the received videos. The segmentation module 202 can perform video/image recognition and segmentation algorithms to generate segmented working area including the pool, and also to eliminate the outliers and non-working area portion. The coordinate system may be created by the following process:

Image Acquisition and Preprocessing:
First, acquire the working area video through the video capture device. Preprocess the video by resizing, cropping, or enhancing it as needed to improve its quality and reduce noise.

Thresholding:
Apply thresholding to segment the image into foreground (working area) and background (outliers). This can be done using simple global thresholding techniques like Otsu's method or adaptive thresholding if lighting conditions vary.

Connected Component Analysis:
Identify connected components in the binary image. These connected components correspond to regions of interest, which may include the working area and any objects within it.

Filtering Outliers:
Define criteria to distinguish outliers from the working area. This could involve size, shape, or position-based criteria. Filter out the outliers by removing connected components that do not meet the criteria.

Bounding Box or Contour Detection:
Determine the bounding box or contour of the remaining connected components, which represent the working area.

Coordinate System Generation:
Establish a coordinate system for the working area. The origin (0,0) can be set at a known reference point within the working area. Define the axes (X and Y) based on the orientation of the working area.

The segmentation module 202 can perform video/image recognition and segmentation algorithms such as convolutional neural networks (CNNs), semantic segmentation and graph-based segmentation, as understood in the art.

In some examples, the localization module 203 can receive the coordinate system of the working area including the pool, from the segmentation module 202. The localization module 203 can determine the position of the pool cleaning robot 104 relative to the pool using the received videos and based on the coordinate system.

In one example, the localization module 203 can determine the position of the pool cleaning robot 104 relative to the pool using the same one or more videos transmitted from the video capture device 102 to the enhancement module 201. In another example, the localization module 203 can determine the position of the pool cleaning robot 104 relative to the pool using one or more different videos. As shown in FIG. 2, the localization module 203 can determine the position of the pool cleaning robot 104 relative to the pool using one or more videos transmitted directly from the video capture device 102 to the localization module 203.

In some examples, the localization module 203 can determine the position of the pool cleaning robot 104 relative to the pool or the coordinate of the pool cleaning robot 104 in the coordinate system using some object localization and real-time tracking algorithms, such as you only look once (YOLO), simple online and realtime tracking (SORT) and fast region CNN, as understood in the art. Similarly, the localization module 203 can also determine the coordinate of the working area including the pool in the coordinate system.

In some examples, the path-planning module 204 can receive the coordinate of the working area and the coordinate of the pool cleaning robot 104 in the coordinate system, from the localization module 203. The path-planning module 204 can generate the moving instruction for the pool cleaning robot 104, based on the position or coordinate of the pool cleaning robot. The path-planning module 204 can generate the moving instruction using algorithms such as simultaneous localization and mapping (SLAM) and rapidly-exploring random tree (RRT), as understood in the art.

In some examples, the path-planning module 204 can send the moving instruction to the pool cleaning robot 104 to instruct the pool cleaning robot 104 to move toward different directions to a specific or desired location of the pool.

According to example implementations of the present disclosure, the processing system 210 and its subsystems including the enhancement module 201, segmentation module 202, localization module 203, and path-planning module 204 may be implemented by various means. Means for implementing the system and its subsystems may include hardware, alone or under direction of one or more computer programs from a computer-readable storage medium. In some examples, one or more apparatuses may be configured to function as or otherwise implement the system and its subsystems shown and described herein. In examples involving more than one apparatus, the respective apparatuses may be connected to or otherwise in communication with one another in a number of different manners, such as directly or indirectly via a wired or wireless network or the like.

In some examples, one or more of the enhancement module 201, segmentation module 202, localization module 203, and path-planning module 204 may be implemented by the secondary computing device 105. For example, the enhancement module 201 can be implemented by the computing device 103. The enhanced video data can be sent by the computing device 103 to the secondary computing device 105. The secondary computing device 105 can receive the data and implement the segmentation module 202 and localization module 203. Then, the secondary computing device 105 can generate the real-time coordinate system of the pool 101 and the real-time coordinate of the pool cleaning robot 104 and transmit them to the computing device 103. The computing device 103 can receive the data and implement the path-planning module 204 to generate the moving directions. The moving directions are sent to the pool cleaning robot 104 through the floating antenna 108.

Figure 3:
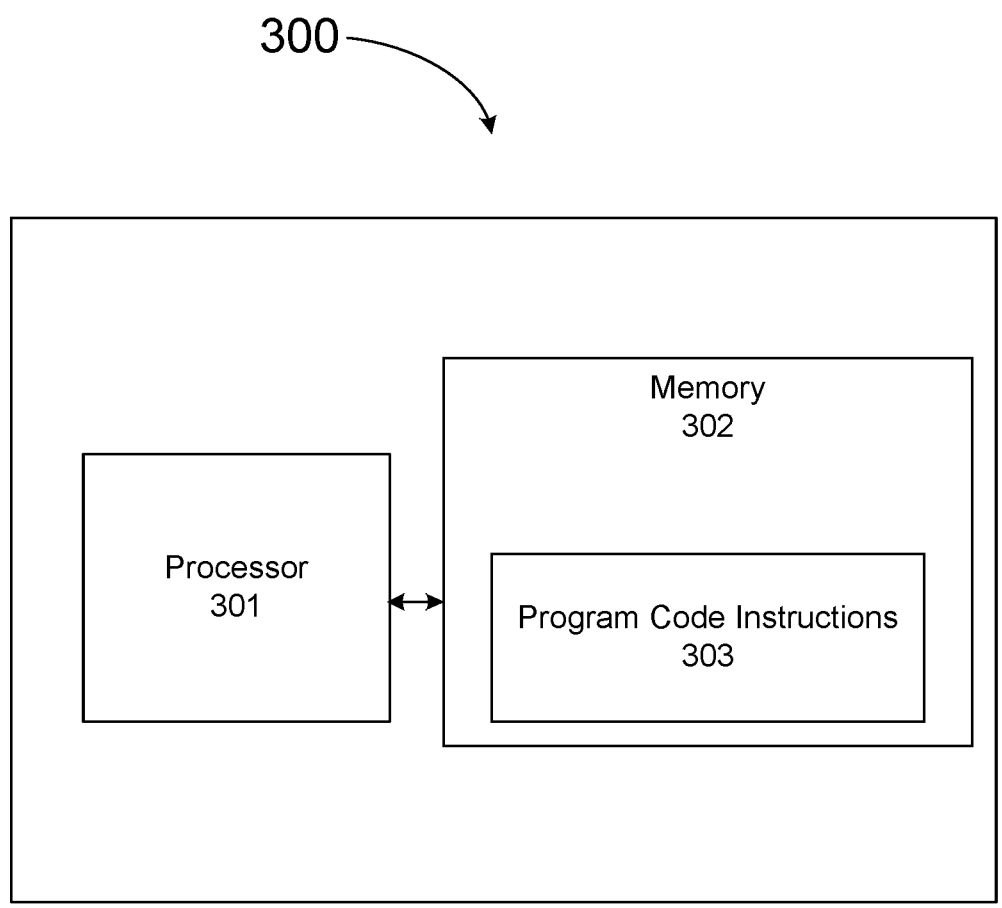
FIG. 3 illustrates a computing device of a pool cleaning system, according to some embodiments of the present disclosure.

FIG. 3 illustrates a computing device 300 of a pool cleaning system, according to some embodiments of the present disclosure. The pool cleaning system may be the pool cleaning system 100 or the pool cleaning system 200, as described above in FIGS. 1 and 2. The computing device 300 may correspond to the computing device 103, as descried above in FIG. 1. The computing device 300 may implement the processing system 210, as descried above in FIG. 2.

As shown in FIG. 3, in some embodiments, the computing device 300 includes a processor 301 and a memory 302 coupled to the processor 301. In some examples, the processor 301 may itself include the memory 302.

In some examples, the processor 301 may be a microprocessor or microcontroller unit (MCU). The processor 301 may be composed of one or more processors alone or in combination with one or more memories. The processor is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 302 (of the same or another apparatus).

The processor 301 may be a number of processors, a multi-core processor or some other type of processor, depending on the particular implementation. Further, the processor may be implemented using a number of heterogeneous processor systems in which a main processor is present with one or more secondary processors on a single chip. Although the processor may be capable of executing a computer program to perform one or more functions, the processor of various examples may be capable of performing one or more functions without the aid of a computer program. In either instance, the processor may be appropriately programmed to perform functions or operations according to example implementations of the present disclosure.

In some examples, the memory 302 may be a computer-readable storage medium. The computer-readable storage medium is a non-transitory device capable of storing information, and is distinguishable from computer-readable transmission media such as electronic transitory signals capable of carrying information from one location to another. The memory 302 is generally any piece of computer hardware that is capable of storing information such as, for example, data, computer programs (e.g., computer-readable program code instructions 303) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above.

In some embodiments, the memory 302 stores computer-readable program code instructions 303. The processor 301 is configured to execute computer-readable program code instructions 303 stored in the memory 302. Execution of the program code instructions may produce a computer-implemented process such that the instructions executed by the computer, processor or other programmable apparatus provide operations for implementing functions described herein. Execution of instructions by a processor, or storage of instructions in a computer-readable storage medium, supports combinations of operations for performing the specified functions described herein. It will also be understood that one or more functions, and combinations of functions, may be implemented by special purpose hardware-based computer systems and/or processors which perform the specified functions, or combinations of special purpose hardware and program code instructions.

In some embodiments, the processor 301 is configured to execute computer-readable program code instructions 303 stored in the memory 302, such that the computing device 300 can be caused to determine a position of a pool cleaning robot relative to a pool using one or more videos transmitted from a video capture device to the computing device 300. The computing device 300 can be also caused to generate a moving instruction for the pool cleaning robot, based on the position of the pool cleaning robot, wherein the pool cleaning robot is separated from the video capture device, and wherein the computing device 300 is separated from the video capture device.

In addition to the memory 302, the processor 301 may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

Figure 4:
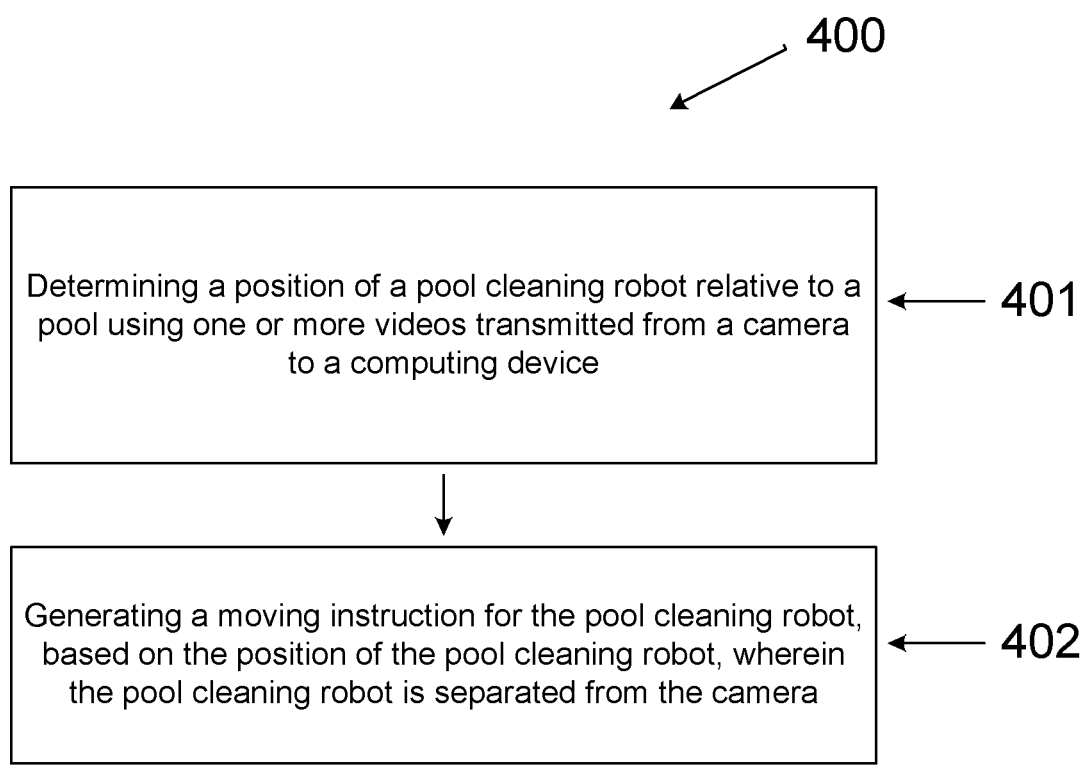
FIG. 4 illustrates a method of controlling a pool cleaning robot, according to some embodiments of the present disclosure.

FIG. 4 illustrates a method 400 of controlling a pool cleaning robot, according to some embodiments of the present disclosure. The pool cleaning robot may be the pool cleaning robot 104, as described above in FIGS. 1 and 2. The method 400 may be implemented by a computing device, which may be the computing device 103 or the computing device 300, as described above in FIGS. 1 and 3. As shown, at block 401, the method includes determining a position of a pool cleaning robot relative to a pool using one or more videos transmitted from a video capture device to the computing device. At block 402, the method includes generating a moving instruction for the pool cleaning robot, based on the position of the pool cleaning robot, wherein the pool cleaning robot is separated from the video capture device.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
   a video capture device;
   a pool cleaning robot separated from the video capture device; and
   a computing device, wherein the video capture device is positioned on the computing device or included as a part of the computing device, and wherein the computing device includes a floating wireless charger for charging the pool cleaning robot;
   wherein the video capture device is configured to transmit one or more videos of a pool to the computing device,
   wherein the computing device comprising a memory and a processor, and wherein the memory stores executable instructions that, in response to execution by the processor, cause the computing device to at least:
      determine a position of the pool cleaning robot relative to the pool using the one or more videos; and
      generate a moving instruction for the pool cleaning robot, based on the position of the pool cleaning robot.

2. The system of claim 1, wherein the one or more videos include a first video and a second video.

3. The system of claim 2, wherein the computing device being caused to determine the position of the pool cleaning robot incudes being caused to:
   create a coordinate system for the pool using the first video including a real time video of the pool; and
   determine the position of the pool cleaning robot relative to the pool using the second video including a previously recorded video and based on the coordinate system.

4. The system of claim 1, wherein the computing device is separated from the pool cleaning robot.

5. The system of claim 1, wherein the pool cleaning robot includes a mark including a lighting device, and wherein the video capture device is configured to track the position of the pool cleaning robot based on the mark.

6. The system of claim 1, further comprising a secondary computing device that is a server in a cloud computing system.

7. The system of claim 1, wherein the computing device is positioned along a side of the pool.

* * * * *